(12) United States Patent
Syu et al.

(10) Patent No.: US 8,825,977 B1
(45) Date of Patent: Sep. 2, 2014

(54) HYBRID DRIVE WRITING COPY OF DATA TO DISK WHEN NON-VOLATILE SEMICONDUCTOR MEMORY NEARS END OF LIFE

(75) Inventors: Mei-Man L. Syu, Fremont, CA (US); Virgil V. Wilkins, Perris, CA (US); William B. Boyle, Lake Forest, CA (US); Alan T. Meyer, Anaheim Hills, CA (US); William C. Cain, Foothill Ranch, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 638 days.

(21) Appl. No.: 12/892,837

(22) Filed: Sep. 28, 2010

(51) Int. Cl.
  *G06F 12/00* (2006.01)
  *G06F 13/00* (2006.01)
  *G06F 13/28* (2006.01)

(52) U.S. Cl.
  USPC ........... 711/165; 711/103; 711/112; 711/162; 714/47.1; 714/1

(58) Field of Classification Search
  USPC ................. 711/103, 112, 165, 162; 714/47.1
  See application file for complete search history.

(56) References Cited

U.S. PATENT DOCUMENTS

| | | | |
|---|---|---|---|
| 5,333,138 A | 7/1994 | Richards et al. | |
| 5,581,785 A | 12/1996 | Nakamura et al. | |
| 5,586,291 A | 12/1996 | Lasker et al. | |
| 6,044,439 A | 3/2000 | Ballard et al. | |
| 6,115,200 A | 9/2000 | Allen et al. | |
| 6,275,949 B1 | 8/2001 | Watanabe | |
| 6,429,990 B2 | 8/2002 | Serrano et al. | |
| 6,661,591 B1 | 12/2003 | Rothberg | |
| 6,662,267 B2 | 12/2003 | Stewart | |
| 6,687,850 B1 | 2/2004 | Rothberg | |
| 6,754,021 B2 | 6/2004 | Kisaka et al. | |
| 6,807,630 B2 | 10/2004 | Lay et al. | |
| 6,898,680 B2 * | 5/2005 | Chambers | 711/159 |
| 6,909,574 B2 | 6/2005 | Aikawa et al. | |
| 6,968,450 B1 | 11/2005 | Rothberg et al. | |
| 7,017,037 B2 | 3/2006 | Fortin et al. | |
| 7,028,174 B1 | 4/2006 | Atai-Azimi et al. | |
| 7,082,494 B1 | 7/2006 | Thelin et al. | |
| 7,107,444 B2 | 9/2006 | Fortin et al. | |
| 7,120,806 B1 | 10/2006 | Codilian et al. | |
| 7,142,385 B2 | 11/2006 | Shimotono et al. | |
| 7,177,184 B2 * | 2/2007 | Chen | 365/185.03 |
| 7,334,082 B2 | 2/2008 | Grover et al. | |
| 7,395,452 B2 | 7/2008 | Nicholson et al. | |
| 7,411,757 B2 | 8/2008 | Chu et al. | |

(Continued)

OTHER PUBLICATIONS

Hannes Payer, Marco A.A. Sanvido, Zvonimir Z. Bandic, Christoph M. Kirsch, "Combo Drive: Optimizing Cost and Performance in a Heterogeneous Storage Device", http://csl.cse.psu.edu/wish2009_papers/Payer.pdf.

(Continued)

*Primary Examiner* — Stephen Elmore
*Assistant Examiner* — Mark Giardino, Jr.

(57) ABSTRACT

A hybrid drive is disclosed comprising a head actuated over a disk, and a non-volatile semiconductor memory (NVSM). When a write command is received from a host that is mapped to the NVSM, the write command is serviced by writing data to the NVSM, and when a life remaining of the NVSM falls below a threshold, by also writing a copy of the data to the disk.

26 Claims, 5 Drawing Sheets

(56) References Cited

U.S. PATENT DOCUMENTS

| | | |
|---|---|---|
| 7,461,202 B2 | 12/2008 | Forrer, Jr. et al. |
| 7,472,222 B2 | 12/2008 | Auerbach et al. |
| 7,477,477 B2 | 1/2009 | Maruchi et al. |
| 7,509,471 B2 | 3/2009 | Gorobets |
| 7,516,346 B2 | 4/2009 | Pinheiro et al. |
| 7,610,438 B2 | 10/2009 | Lee et al. |
| 7,613,876 B2 | 11/2009 | Bruce et al. |
| 7,644,231 B2 | 1/2010 | Recio et al. |
| 7,685,360 B1 | 3/2010 | Brunnett et al. |
| 7,752,491 B1 | 7/2010 | Liikanen et al. |
| 2006/0195657 A1 | 8/2006 | Tien et al. |
| 2008/0040537 A1 | 2/2008 | Kim |
| 2008/0059694 A1 | 3/2008 | Lee |
| 2008/0130156 A1 | 6/2008 | Chu et al. |
| 2008/0177938 A1 | 7/2008 | Yu |
| 2008/0222353 A1* | 9/2008 | Nam et al. ............ 711/113 |
| 2008/0256287 A1 | 10/2008 | Lee et al. |
| 2008/0307270 A1* | 12/2008 | Li ............................ 714/47 |
| 2009/0019218 A1 | 1/2009 | Sinclair et al. |
| 2009/0031072 A1 | 1/2009 | Sartore |
| 2009/0103203 A1 | 4/2009 | Yoshida |
| 2009/0106518 A1 | 4/2009 | Dow |
| 2009/0144501 A2 | 6/2009 | Yim et al. |
| 2009/0150599 A1 | 6/2009 | Bennett |
| 2009/0172324 A1 | 7/2009 | Han et al. |
| 2009/0249168 A1 | 10/2009 | Inoue |
| 2009/0271562 A1 | 10/2009 | Sinclair |
| 2009/0327603 A1 | 12/2009 | McKean et al. |
| 2010/0088459 A1 | 4/2010 | Arya et al. |

OTHER PUBLICATIONS

Gokul Soundararajan, Vijayan Prabhakaran, Mahesh Balakrishan, Ted Wobber, "Extending SSD Lifetimes with Disk-Based Write Caches", http://research.microsoft.com/pubs/115352/hybrid.pdf, Feb. 2010.

Xiaojian Wu, A. L. Narasimha Reddy, "Managing Storage Space in a Flash and Disk Hybrid Storage System", http://www.ee.tamu.edu/~reddy/papers/mascots09.pdf.

Tao Xie, Deepthi Madathil, "Sail: Self-Adaptive File Reallocation on Hybrid Disk Arrays", The 15th Annual IEEE International Conference on High Performance Computing (HiPC 2008), Bangalore, India, Dec. 17-20, 2008.

Non-Volatile Memory Host Controller Interface revision 1.0 specification available for download at http://www.intel.com/standards/nvmhci/index.htm. Ratified on Apr. 14, 2008, 65 pages.

U.S. Appl. No. 12/720,568, filed Mar. 9, 2010, 22 pages.

* cited by examiner

HYBRID DRIVE WRITING COPY OF DATA TO DISK WHEN NON-VOLATILE SEMICONDUCTOR MEMORY NEARS END OF LIFE

BACKGROUND

Hybrid drives are conventional disk drives augmented with a non-volatile semiconductor memory (NVSM) such as a flash which helps improve certain aspects of the disk drive. For example, the non-volatile semiconductor memory may store boot data in order to expedite the boot operation of a host computer. Another use of a NVSM may be to store frequently accessed data and/or non-sequential data for which the access time is typically much shorter than the disk (which suffers from mechanical latency including seek and rotational latency). Other policies may reduce write amplification of the NVSM in order to maximize its longevity, such as storing frequently written data to the disk (or data having a write/read ratio that exceeds a predetermined threshold).

DETAILED DESCRIPTION OF EMBODIMENTS OF THE INVENTION

Figures 1A, 1B:
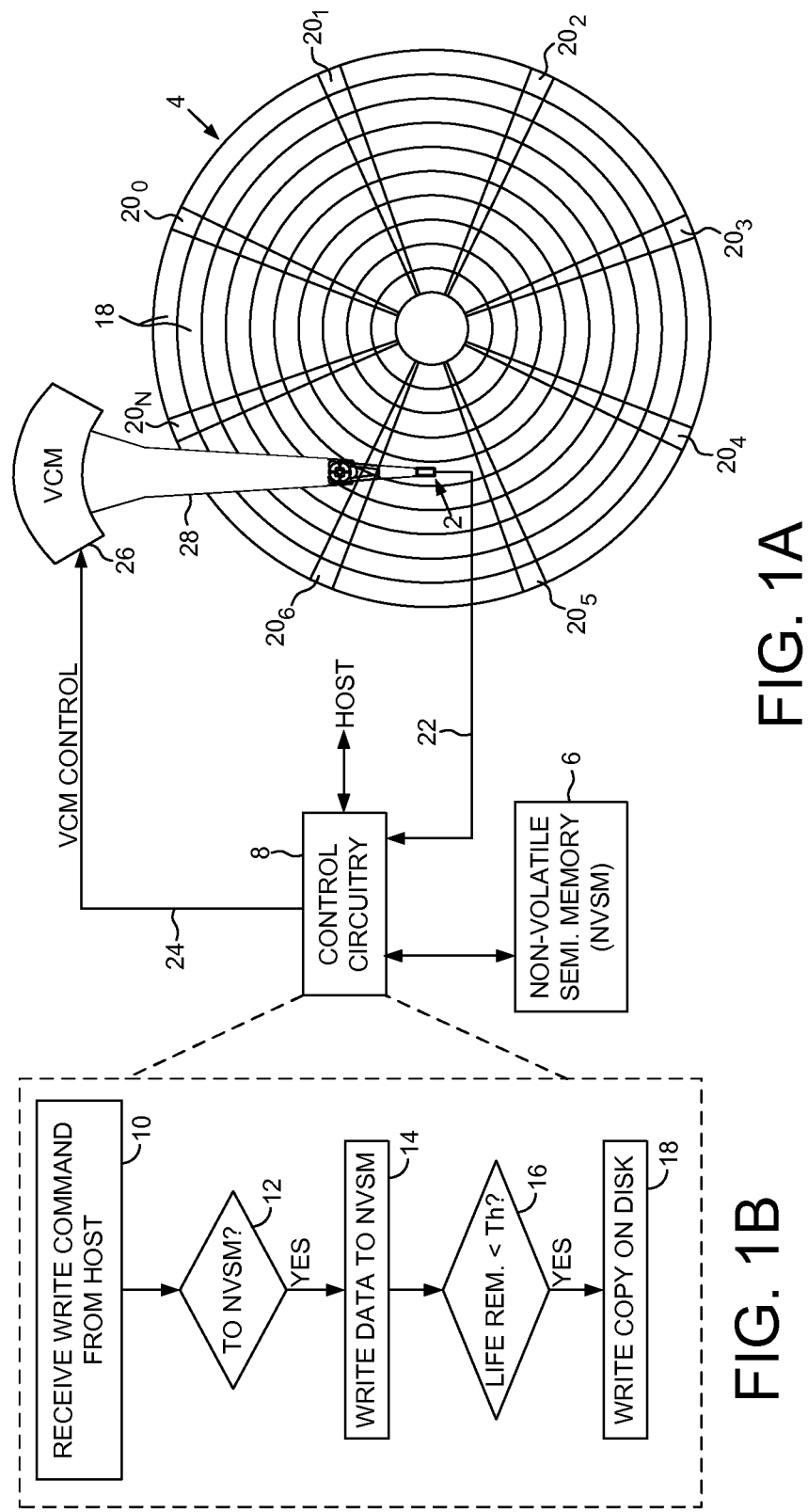
FIG. 1A shows a hybrid drive according to an embodiment of the present invention comprising a head actuated over a disk, and a non-volatile semiconductor memory (NVSM).
FIG. 1B is a flow diagram according to an embodiment of the present invention wherein when a write command is received from a host that is mapped to the NVSM, and a life remaining of the NVSM falls below a threshold, a copy of the data is also written to the disk.

FIG. 1A shows a hybrid drive according to an embodiment of the present invention comprising a head 2 actuated over a disk 4, and a non-volatile semiconductor memory (NVSM) 6. The hybrid drive further comprises control circuitry 8 operable to execute the flow diagram of FIG. 1B, wherein when a write command is received from a host (step 10) that is mapped to the NVSM (step 12), the write command is serviced by writing the data to the NVSM (step 14), and when a life remaining of the NVSM falls below a threshold (step 16), by also writing a first copy of the data to the disk (step 18).

The disk 4 shown in the embodiment of FIG. 1A comprises a plurality of servo sectors $20_0$-$20_N$ that define data tracks 18. The control circuitry 8 processes a read signal 22 emanating from the head 2 to demodulate the servo sectors $20_0$-$20_N$ into a position error signal (PES) representing a position error of the head relative to a target data track. The control circuitry 8 comprises a servo compensator for filtering the PES to generate a control signal 24 applied to a voice coil motor (VCM) 26 that rotates an actuator arm 28 about a pivot in order to actuate the head 2 radially over the disk 4 in a direction that reduces the PES.

In the embodiment of FIG. 1A, any suitable NVSM 6 may be employed, such as any suitable electrically erasable/programmable memory (e.g., a flash memory). In one embodiment, the NVSM 6 comprises a plurality of blocks, where each block comprises a plurality of memory segments referred to as pages and each page may store one or more data sectors. The blocks are programmed a page at a time, and an entire block is erased in a unitary operation. In one embodiment, a garbage collection operation may be executed on previously written blocks in order to copy valid pages to new blocks (and/or to the disk) so that the previously written blocks may be erased and re-used.

In one embodiment, there is a limited number of program/erase cycles that may be performed on each block in the NVSM 6 (referred to as endurance). A wear leveling algorithm is typically executed to spread write operations evenly over the blocks so that the blocks wear out together. Prior to degrading to the point where written data may become unrecoverable, the NVSM 6 is typically disabled so that subsequent write operations are serviced by the disk 4. However, there may still be a significant amount of life remaining for a number of the blocks when the NVSM 6 disabled, which reduces performance of the hybrid drive prematurely. Accordingly, in one embodiment of the present invention, when the NVSM 6 nears end of life (or a block within the NVSM 6 nears end of life), the data written to the NVSM 6 is also written to a backup copy on disk 4. In this manner, if data in the NVSM 6 becomes unrecoverable, the backup copy can still be recovered from the disk, thereby enabling use of the NVSM 6 until it literally reaches the end of its life.

Figure 2:
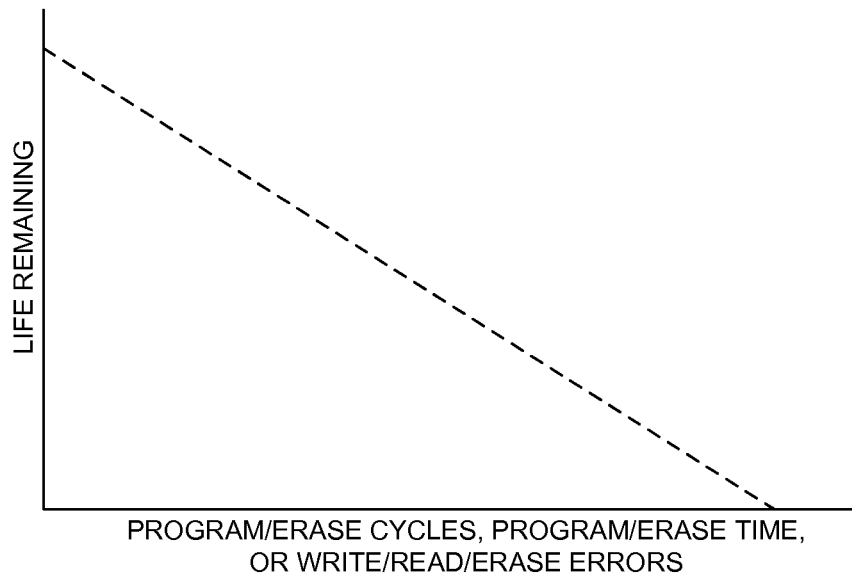
FIG. 2 shows an embodiment of the present invention wherein the life remaining of the NVSM is determined based on a number of program/erase cycles, program/erase times, or write/read/erase errors.

Any suitable technique may be employed to determine the life remaining of the NVSM 6 (or a block in the NVSM 6) in order to enable the backup operation. FIG. 2 shows an embodiment wherein the life remaining may be determined from a number of program/erase cycles performed on the NVSM 6 (or block), the program or erase time, or an error detected when writing/reading/erasing data when accessing the NVSM 6. The number of program/erase cycles (endurance) of the NVSM 6 may be pre-characterized such that the life remaining is essentially estimated. In addition, one or both of the program and erase times will typically increase as a block wears out and therefore may also reflect the life remaining of the particular block, as well as the entire NVSM 6. Similarly, an error detected during a write/read/erase operation to the NVSM 6 is typically a sign of wear and therefore a reflection of the life remaining of the particular block, as well as the entire NVSM 6. A write error or erase error may be detected if the NVSM 6 fails a write verify operation (reading the data after writing), and a read error may be detected by an error correction code (ECC). Read errors may be correctable such that the corresponding page is recoverable, or read errors may be uncorrectable such that the corresponding page is unrecoverable. In any event, when a page exhibits one or more signs that it's nearing end of life (life remaining falling below a threshold), the data stored in the failing block may be backed up to the disk (when servicing write or read commands to the block). In one embodiment, when a predetermined number of blocks begin to fail, it is assumed that all blocks are beginning to fail and therefore a disk backup copy is made for all data stored in the NVSM 6 when servicing write/read commands to/from the NVSM 6.

In the embodiment of FIG. 1B, when servicing a write command using the NVSM 6 and the life remaining has fallen below a threshold, the data is written to both the NVSM 6 and the disk 4. In one embodiment, the NVSM 6 (or block) may be marked as failing prior to receiving the write command, and therefore a copy of the data will be stored on the disk 4 regardless as to a result of the current NVSM write operation. In another embodiment, a written block will be detected as failing due to a write error (e.g., a write verify error) and therefore a copy of the data is stored on the disk 4 in response to the write error.

Figure 3A:
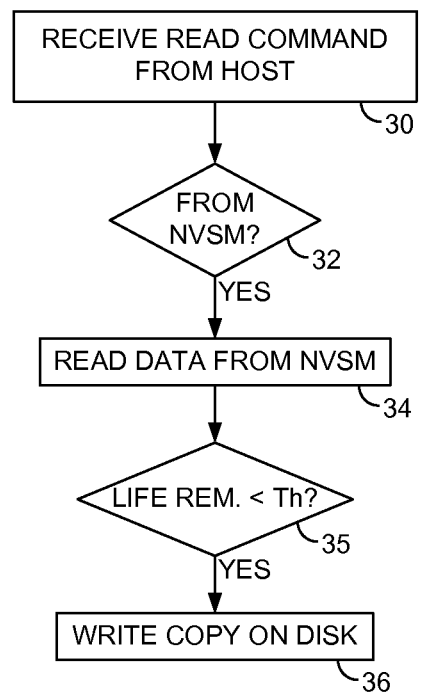
FIG. 3A is a flow diagram according to an embodiment of the present invention wherein when a read command is received from the host that is mapped to the NVSM, data is read from the NVSM, and when a life remaining of the NVSM falls below a threshold, a copy of the data read from the NVSM is also written to the disk.

FIG. 3A shows a flow diagram according to an embodiment of the present invention wherein when a read command is received from the host (step 30) and the data is stored in a block of the NVSM (step 32), the read command is serviced by reading data from the block (step 34), and when a life remaining of the NVSM (or block) falls below a threshold (step 35), by also writing a copy of the data read from the NVSM to the disk (step 36). In one embodiment, the entire NVSM is determined to be failing and therefore a copy of the data is always written to the disk when servicing read commands from any block of the NVSM. In an alternative embodiment, each block is determined to be failing independent of the other blocks, and therefore a copy of the data is written to the disk only when servicing a read command from a failing block.

Figure 3B:
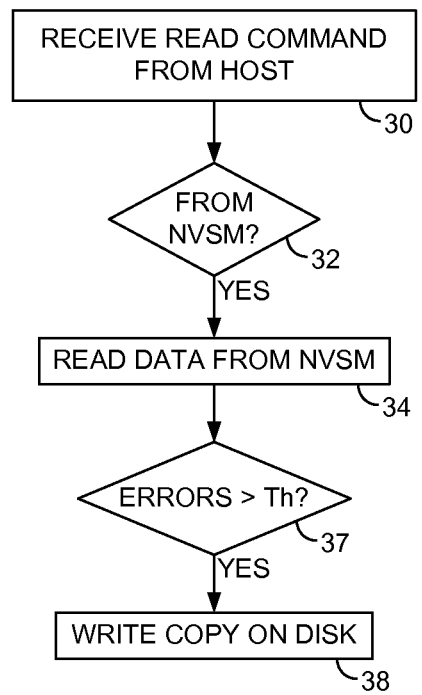
FIG. 3B is a flow diagram according to an embodiment of the present invention wherein when a read command is received from the host, and a number of correctable read errors exceeds a threshold when reading data from the NVSM, a copy of the data read from the NVSM is also written to the disk.

In another embodiment illustrated in the flow diagram of FIG. 3B, when a read command is received from the host (step 30) and the data is stored in a block of the NVSM (step 32), the read command is serviced by reading data the block (step 34) and detecting a number of correctable errors. When the number of correctable errors exceeds a threshold (step 37), a copy of the data read from the NVSM is written to the disk (step 38). In one embodiment, when data is read from other pages of the failing block (and a backup copy has not yet been written to the disk), the data is copied to the disk regardless as to the number of correctable errors detected. In another embodiment, when the number of correctable errors exceeds the threshold for a predetermined number of blocks, a backup copy is written to the disk when data is read from any of the blocks in the NVSM (and a backup copy has not yet been written to the disk).

Figure 4:
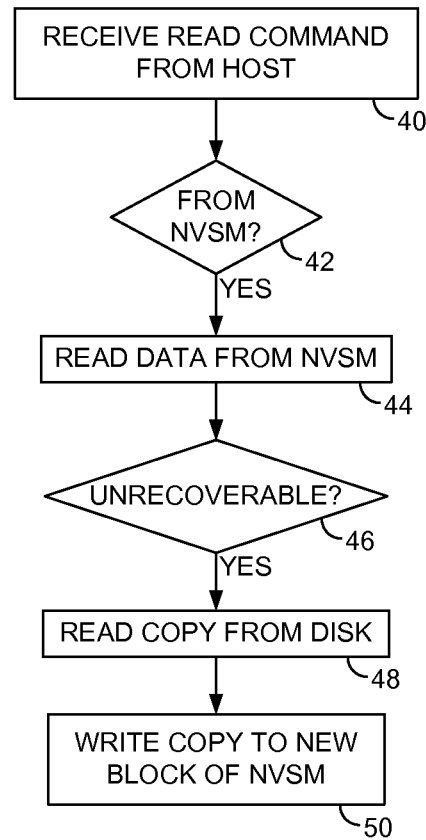
FIG. 4 is a flow diagram according to an embodiment of the present invention wherein when data is unrecoverable from the NVSM, the copy is read from the disk and written to a new page of the NVSM.

FIG. 4 shows a flow diagram according to an embodiment of the present invention wherein when a read command is received from the host (step 40), and the data is stored on the NVSM (step 42), the read command is serviced by attempting to read the data from the NVSM (step 44). If the data is unrecoverable from the NVSM (step 46), the backup copy is read from the disk (step 48), and the data read from the disk is written to a new block in the NVSM (step 50). In one embodiment, the block comprising the unrecoverable page is marked as read-only to prevent any further write operations to the block. In an alternative embodiment, the block is removed from the garbage collection operation so that it eventually becomes read only after all empty pages have been written a final time. This embodiment enables continued read operations on the other pages of the block until all of the pages become unrecoverable. That is, a block is not retired as unusable until all of the pages have become unrecoverable (or invalidated due to an overwrite of the corresponding LBAs), thereby realizing the benefit of every page in every block until each page reaches end of life (or is invalidated).

Figure 5:
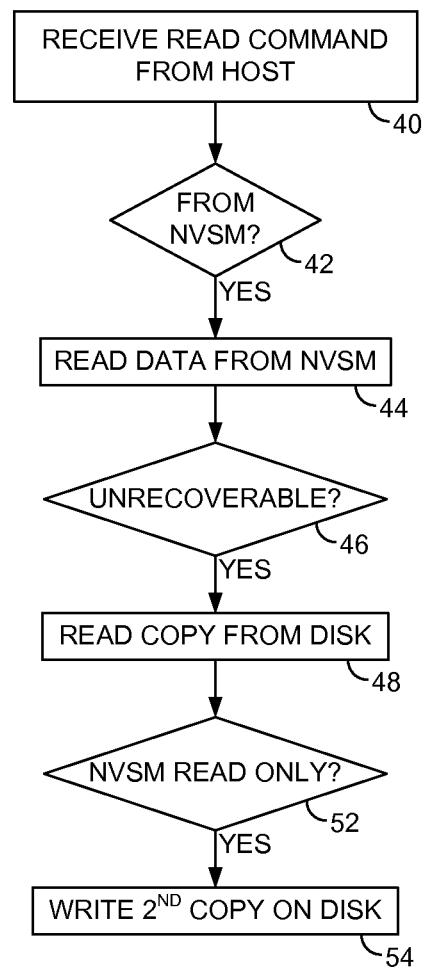
FIG. 5 is a flow diagram according to an embodiment of the present invention wherein when data is unrecoverable from the NVSM and the NVSM is read only, a second copy of the data is written to the disk.

In one embodiment, all of the blocks in the NVSM will eventually become read only as the NVSM nears end of life. Accordingly, in an embodiment shown in the flow diagram of FIG. 5, when a read command is received (step 40) and a corresponding page in a block of the NVSM is unrecoverable (step 46) requiring the backup copy of the data to be read from the disk (step 48), and if all of the blocks in the NVSM have been converted to read only (step 52), then a backup copy of the data is stored on the disk (step 54). This embodiment ensures that at least two copies of the data are stored in non-volatile memory (both copies on the disk) in the event that one of the copies becomes unrecoverable.

Figure 6A:
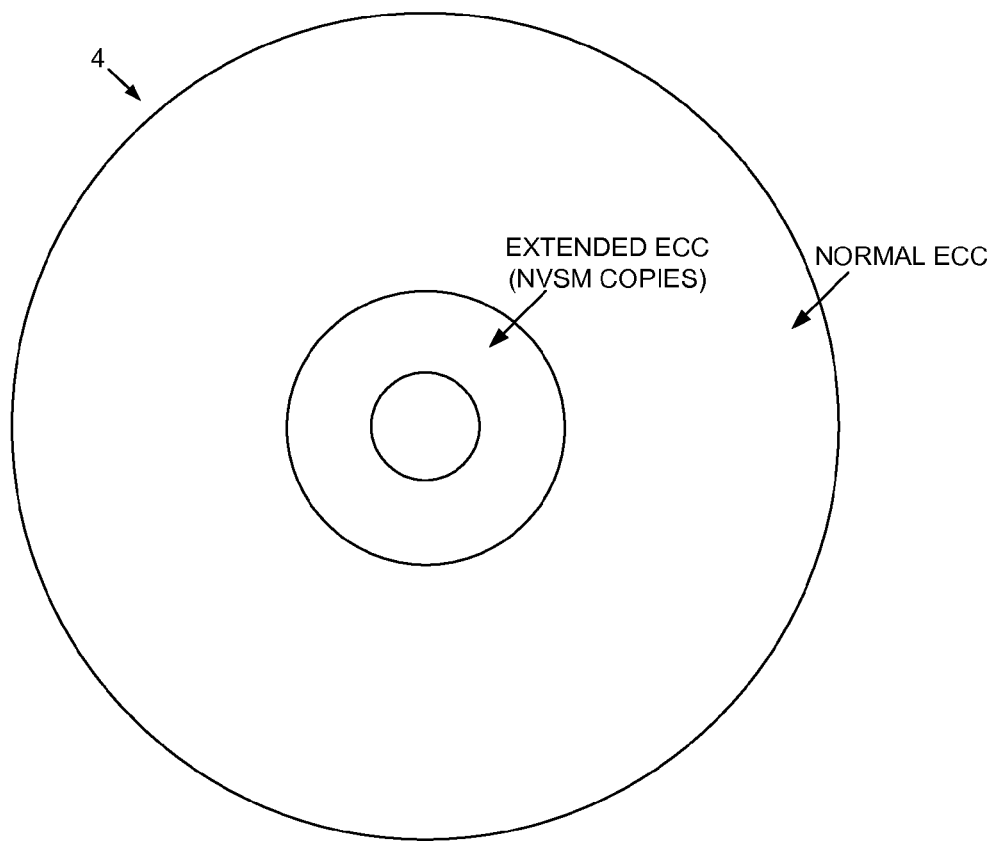
FIGS. 6A and 6B show an embodiment of the present invention wherein a copy of NVSM data is stored on the disk in an area having an increased number of ECC symbols.
Figure 6B:
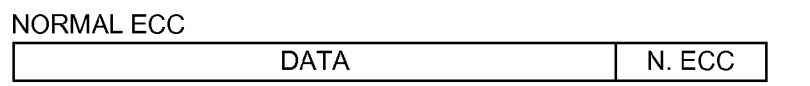
Figure 6B:
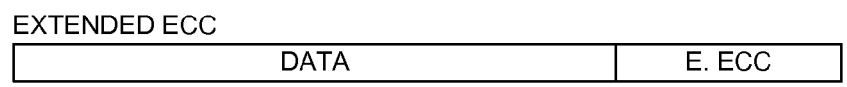

FIGS. 6A and 6B show an embodiment of the present invention wherein the disk comprises a first plurality of data tracks for storing data sectors having a first number of error correction code (ECC) symbols, and a second plurality of data tracks having a second (greater) number of ECC symbols. When a backup copy of data stored in the NVSM is written to the disk, it is written to a data sector in the second plurality of data tracks in order to increase the reliability of the data. For example, in one embodiment the NVSM is used to store highly critical data (e.g., operating system data) whereas the first plurality of data tracks on the disk are used to store less critical data (e.g., audio/video files). Therefore, the backup copy of the NVSM data is stored on the disk using extended ECC symbols to help ensure the data is recoverable when the NVSM copy becomes unrecoverable. In the example shown in FIG. 6B, the ECC symbols are generated using any suitable polynomial code (e.g., a Reed-Solomon code) wherein the ECC symbols are appended to the end of each data sector. However, any suitable ECC may be employed, such as any suitable iterative code such as a low-density parity-check (LDPC) code wherein the ECC symbols are distributed throughout each data sector.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller and/or NVSM controller, or certain steps described above may be performed by a read channel and others by a disk controller and/or NVSM controller. In one embodiment, the read channel and controllers are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into an SOC.

In one embodiment, the control circuitry comprises a microprocessor executing instructions, the instructions being operable to cause the microprocessor to perform the steps of the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the hybrid drive is powered on. In yet another embodiment, the control circuitry comprises suitable logic circuitry, such as state machine circuitry.

What is claimed is:

1. A hybrid drive comprising:
a disk;
a head actuated over the disk;
a non-volatile semiconductor memory (NVSM); and
control circuitry operable to:
receive a write command from a host, the write command comprising first data;
service the write command by:
writing the first data to the NVSM; and
when a life remaining of the NVSM falls below a threshold, writing a first copy of the first data to the disk;
after servicing the write command, receive a first read command from the host; and
service the first read command by:
reading the first data from the NVSM; and
when the first data is unrecoverable from the NVSM, reading the first copy of the first data from the disk.

2. The hybrid drive as recited in claim 1, wherein the control circuitry is further operable to determine the life remaining of the NVSM relative to a number of program/erase cycles.

3. The hybrid drive as recited in claim 1, wherein the control circuitry is further operable to determine the life remaining of the NVSM relative to at least one of a program time and an erase time.

4. The hybrid drive as recited in claim 1, wherein the control circuitry is further operable to determine the life remaining of the NVSM relative to a number of read errors.

5. The hybrid drive as recited in claim 1, wherein the control circuitry is further operable to:
receive a second read command from the host; and
service the second read command by:
reading second data from the NVSM; and
when the life remaining of the NVSM falls below the threshold, writing a copy of the second data to the disk.

6. The hybrid drive as recited in claim 1, wherein the control circuitry is further operable to:
receive a second read command from the host; and
service the second read command by:
detecting a number of correctable errors when reading second data from the NVSM; and
when the number of correctable errors exceeds a threshold, writing a copy of the second data to the disk.

7. The hybrid drive as recited in claim 1, wherein when the first data is unrecoverable from the NVSM, the control circuitry is further operable to write a second copy of the first data to the NVSM.

8. The hybrid drive as recited in claim 1, wherein when the first data is unrecoverable from the NVSM and the NVSM is read only, the control circuitry is further operable to write a second copy of the first data to the disk.

9. The hybrid drive as recited in claim 1, wherein the control circuitry is further operable to:
write to a first area of the disk using a first number of error correction code (ECC) symbols;
write to a second area of the disk using a second number of ECC symbols, wherein the second number is greater than the first number; and
write the first copy of the first data to the second area of the disk.

10. A hybrid drive comprising:
a disk;
a head actuated over the disk;
a non-volatile semiconductor memory (NVSM); and
control circuitry operable to:
receive a first read command from a host;
service the first read command by:
detecting a number of correctable errors when reading first data from the NVSM; and
when the number of correctable errors exceeds a threshold, writing a first copy of the first data to the disk;
receive a second read command from a host; and
service the second read command by:
reading the first data from the NVSM; and
when the first data is unrecoverable from the NVSM, reading the first copy of the first data from the disk.

11. The hybrid drive as recited in claim 10, wherein when the first data is unrecoverable from the NVSM the control circuitry is further operable to service the second read command by writing a second copy of the first data to the NVSM.

12. The hybrid drive as recited in claim 10, wherein when the first data is unrecoverable from the NVSM and the NVSM is read only the control circuitry is further operable to service the second read command by writing a second copy of the first data to the disk.

13. The hybrid drive as recited in claim 10, wherein the control circuitry is further operable to:
write to a first area of the disk using a first number of error correction code (ECC) symbols;
write to a second area of the disk using a second number of ECC symbols, wherein the second number is greater than the first number; and
write the first copy of the first data to the second area of the disk.

14. A method of operating a hybrid drive, the hybrid drive comprising a head actuated over a disk, and a non-volatile semiconductor memory (NVSM), the method comprising:
receiving a write command from a host, the write command comprising first data;
servicing the write command by:
writing the first data to the NVSM; and
when a life remaining of the NVSM falls below a threshold, writing a first copy of the first data to the disk;
after servicing the write command, receiving a first read command from the host; and
servicing the first read command by:
reading the first data from the NVSM; and
when the first data is unrecoverable from the NVSM, reading the first copy of the first data from the disk.

15. The method as recited in claim 14, further comprising determining the life remaining of the NVSM relative to a number of program/erase cycles.

16. The method as recited in claim 14, further comprising determining the life remaining of the NVSM relative to at least one of a program time and an erase time.

17. The method as recited in claim 14, further comprising determining the life remaining of the NVSM relative to a number of read errors.

18. The method as recited in claim 14, further comprising:
receiving a second read command from the host; and
servicing the second read command by:
reading second data from the NVSM; and
when the life remaining of the NVSM falls below the threshold, writing a copy of the second data to the disk.

19. The method as recited in claim 14, further comprising:
receiving a second read command from the host; and
servicing the second read command by:
detecting a number of correctable errors when reading second data from the NVSM; and when the number of correctable errors exceeds a threshold, writing a copy of the second data to the disk.

20. The method as recited in claim 14, wherein when the first data is unrecoverable from the NVSM, further comprising writing a second copy of the first data to the NVSM.

21. The method as recited in claim 14, wherein when the first data is unrecoverable from the NVSM and the NVSM is read only, further comprising writing a second copy of the first data to the disk.

22. The method as recited in claim 14, further comprising:
    writing to a first area of the disk using a first number of error correction code (ECC) symbols;
    writing to a second area of the disk using a second number of ECC symbols, wherein the second number is greater than the first number; and
    writing the first copy of the first data to the second area of the disk.

23. A method of operating a hybrid drive, the hybrid drive comprising a head actuated over a disk, and a non-volatile semiconductor memory (NVSM), the method comprising:
    receiving a first read command from a host; and
    servicing the first read command by:
        detecting a number of correctable errors when reading first data from the NVSM; and
        when the number of correctable errors exceeds a threshold, writing a first copy of the first data to the disk;
    receiving a second read command from a host; and
    servicing the second read command by:
        reading the first data from the NVSM; and
        when the first data is unrecoverable from the NVSM, reading the first copy of the first data from the disk.

24. The method as recited in claim 23, wherein when the first data is unrecoverable from the NVSM, further comprising servicing the second read command by writing a second copy of the first data to the NVSM.

25. The method as recited in claim 23, wherein when the first data is unrecoverable from the NVSM further comprising servicing the second read command by writing a second copy of the first data to the disk.

26. The method as recited in claim 23, further comprising:
    writing to a first area of the disk using a first number of error correction code (ECC) symbols;
    writing to a second area of the disk using a second number of ECC symbols, wherein the second number is greater than the first number; and
    writing the first copy of the first data to the second area of the disk.

* * * * *